United States Patent [19]
Honda et al.

[11] 4,334,763
[45] Jun. 15, 1982

[54] ELECTROPHOTOGRAPHIC COPYING APPARATUS

[75] Inventors: Haruhisa Honda; Shinji Murata, both of Tokyo; Tsutomu Toyono, Higashi Ohizumimachi; Yoshiaki Sone, Tokyo; Teruo Morikawa, Sagamihara, all of Japan

[73] Assignee: Canon Kabushiki Kaisha, Tokyo, Japan

[21] Appl. No.: 141,920

[22] Filed: Apr. 21, 1980

[30] Foreign Application Priority Data

Apr. 24, 1979 [JP] Japan .............................. 54-51127

[51] Int. Cl.[3] .................... G03G 15/28; G03B 27/54; G03B 27/72

[52] U.S. Cl. .................................... 355/8; 355/3 R; 355/67

[58] Field of Search ...................... 355/3 R, 8, 67, 71

[56] References Cited

U.S. PATENT DOCUMENTS

| | | | |
|---|---|---|---|
| 2,478,443 | 8/1949 | Yule et al. | 355/71 X |
| 3,998,541 | 12/1976 | Michaloski | 355/67 X |
| 4,046,466 | 9/1977 | Ando et al. | 355/3 R |
| 4,095,889 | 6/1978 | Goren | 355/71 X |
| 4,118,119 | 10/1978 | Maiorano | 355/67 X |
| 4,194,831 | 3/1980 | Hartwig et al. | 355/67 X |

*Primary Examiner*—Fred L. Braun
*Attorney, Agent, or Firm*—Fitzpatrick, Cella, Harper & Scinto

[57] ABSTRACT

An electrophotographic copying apparatus includes original supporting device for supporting thereon an original to be copied, illuminating device for illuminating the original, an electrophotographic photosensitive medium movable through a charging station, a developing station and an image transfer station, the photosensitive medium having an image bearing area and a non-image bearing area set thereon, the non-image bearing area being set on the side edge portion of the photosensitive medium, charging device for charging both of the two areas of the photosensitive medium at the charging station, a projection optical system for projecting the optical image of the original upon the image bearing area of the photosensitive medium between the charging station and the developing station to form an electrostatic latent image, developing device for developing the electrostatic latent image into a visible image, image transfer device for transferring the visible image from the photosensitive medium to a transfer medium, supply device for supplying the transfer medium to the image transfer station through a route which brings a predetermined width area of the side edge portion of the transfer medium into accord with the non-image bearing area of the photosensitive medium, separator device adapted to engage the predetermined width area of the transfer medium to separate from the photosensitive medium the transfer medium having the visible image transferred thereto, and reflecting device disposed at a position between the illuminating device and the original supporting device and corresponding to the side edge portion of the original. The light from the illuminating device reflected by the reflecting device passes through the projection optical system and impinges on the non-image bearing area of the photosensitive medium between the charging station and the developing station.

30 Claims, 17 Drawing Figures

ELECTROPHOTOGRAPHIC COPYING APPARATUS

BACKGROUND OF THE INVENTION

1. Field of the Invention

This invention relates to an electrophotographic copying apparatus of the image transfer type in which illumination light is applied to a predetermined width area of the side edge portion of a movable electrophotographic photosensitive medium to form a light portion potential on this area and prevent developer from adhering to such area.

2. Description of the Prior Art

For example, in a copying apparatus wherein a visible image of an original is formed on a movable electrophotographic photosensitive medium and the visible image is transferred to transfer paper, the transfer paper having the visible image transferred thereto must be separated from the photosensitive medium. The method of forcibly separating the transfer paper from the photosensitive medium by causing the side edge portion of the transfer paper to engage belt-like means, pawl-like means or the like is known. This separator means in the form of a belt, a pawl or the like is caused to bear against or be in proximity to the side edge portion of the photosensitive medium. If developer adheres to a predetermined width area of the side edge portion of the photosensitive medium against which or to which the separator means bears or is in proximity, the separator means will be contaminated by the developer, because where the separator means bears against the photosensitive medium, it scrapes the developer from the photosensitive medium and, even where the separator is spaced apart from the photosensitive medium, when a predetermined width area of the side edge portion of the transfer medium engages the separator means, the developer transferred to that portion of the transfer medium adheres to the separator means. In any case, if the separator means is thus contaminated by the developer, unsatisfactory separation of the transfer medium from the photosensitive medium will occur and there will also occur inconveniences that the image is disturbed and that the transfer medium is contaminated. For this reason, it has heretofore been practised to impart supplemental exposure light to that portion of the photosensitive medium against which or to which the separator means bears or is in proximity, to thereby provide a sufficient light portion potential to that portion and prevent adherence of the developer from occurring during development. Heretofore, the device as shown in FIG. 1 of the accompanying drawings has been common as a device for imparting such supplemental exposure light.

In FIG. 1, reference character 1 designates a drum having an electrophotographic photosensitive medium on the peripheral surface thereof and rotatable about the axis X thereof. The effective image forming area 3 of the photosensitive medium (that area of the photosensitive medium on which the image of an original to be transferred is formed) is slit-exposed to the original image through a lens 2. Designated by 4 is the portion against which the aforementioned separator means 12 bears. This portion 4 is a side edge portion of the photosensitive medium with respect to the direction of the bus bar thereof, and it is a small width area adjacent to the effective image forming area 3. Supplemental exposure light is imparted to this portion 4 from a lamp 5 disposed within a light-shielding housing 6 having a slit opening in the lower portion thereof and the image of the original is not formed on this portion. However, such a device has the following disadvantages.

(1) Since the light source 5 for supplemental exposure is near the photosensitive drum, part of the light emitted through the opening of the housing 6 becomes so-called stray light and comes round to the effective image area 3, also.

(2) The opening of the housing 6 cannot be sufficiently proximate to the photosensitive drum. Therefore, supplemental exposure for clarifying the boundary between the areas 3 and 4 is difficult.

(3) The light source 5 is specially necessary for supplemental exposure.

SUMMARY OF THE INVENTION

It is an object of the present invention to provide an electrophotographic copying apparatus which eliminates the above-noted inconveniences peculiar to the apparatus of the prior art.

It is another object of the present invention to provide an electrophotographic copying apparatus in which supplemental exposure light does not impinge as stray light upon the image bearing area of the photosensitive medium.

It is still another object of the present invention to provide an electrophotographic copying apparatus which permits the use of supplemental exposure which enables the boundary between the image bearing area and the non-image bearing area to be formed clearly.

It is yet still another object of the present invention to provide an electrophotographic copying apparatus which does not have any special light source for supplemental exposure.

It is a further object of the present invention to provide an electrophotographic copying apparatus provided with a supplemental exposure device of simple construction.

Other objects and features of the present invention will become apparent from the following detailed description of the invention taken in conjunction with the accompanying drawings.

DESCRIPTION OF THE PREFERRED EMBODIMENTS

Figure 1:
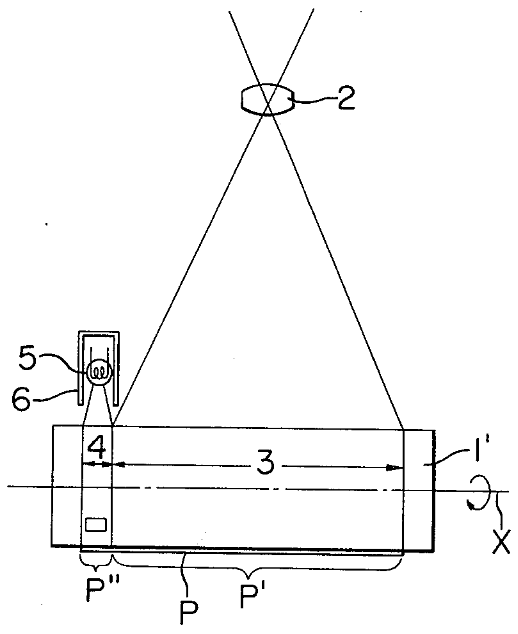
FIG. 1 PRIOR ART
FIG. 1 illustrates the known apparatus.
Figure 3:
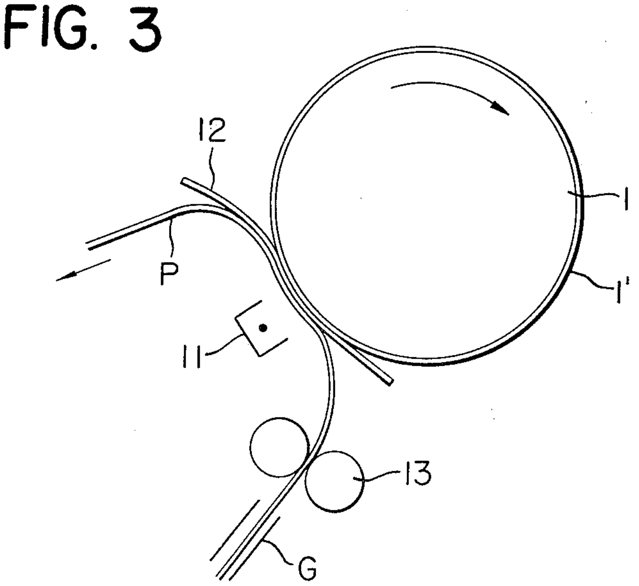
FIG. 3 is a partial illustration of an embodiment of the present invention.
Figure 2:
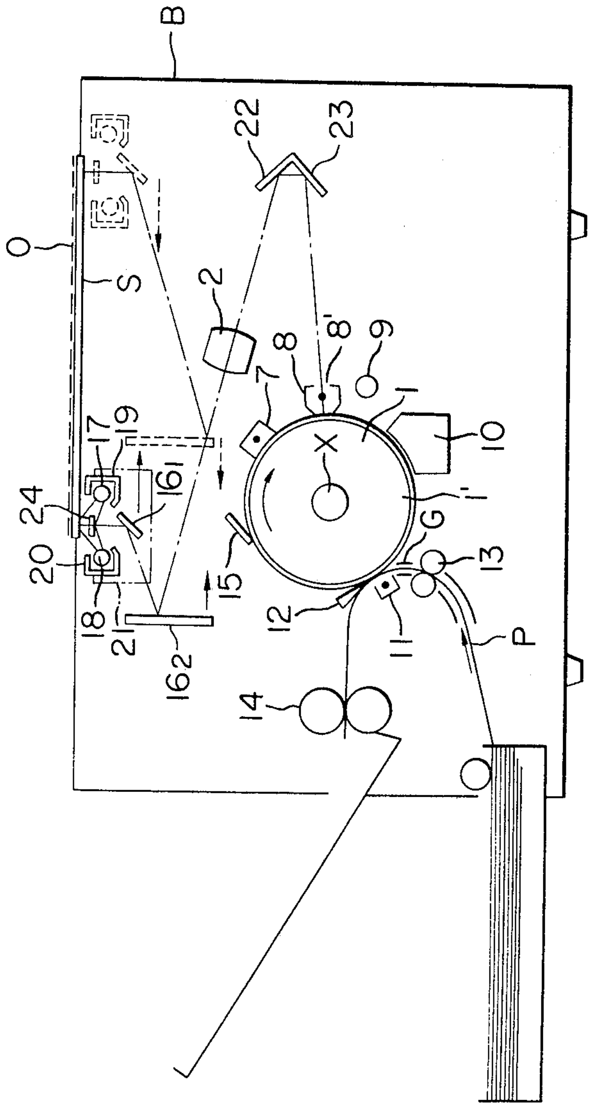
FIG. 2 illustrates an embodiment of the present invention.

Referring to FIG. 1, reference character 1 designates a photosensitive drum provided with an electrophotographic photosensitive medium 1′ comprising a photoconductive layer and a transparent insulating layer successively layered on an electrically conductive member. The photosensitive drum 1 is rotated about its axis X at a constant velocity in the direction of arrow. With the rotation of the drum 1, the surface of the photosensitive medium 1′ is subjected to uniform charge of a polarity corresponding to the characteristic of the photoconductive layer by a DC corona discharger 7 at a charging station, and subsequently, at a light image exposure station, it is exposed to the image forming light beam from an original O and simultaneously therewith, is subjected to AC corona discharge or DC corona discharge opposite in polarity to said charge, by a discharger 8, whereby a charge pattern corresponding to the light-and-dark pattern of the light image of the original may be formed on the surface of the photosensitive medium. After the formation of said charge pattern, the whole surface of the photosensitive medium 1′ is uniformly exposed to the light from a lamp 9, whereby an electrostatic latent image of high contrast corresponding to the light image of the original is formed on the photosensitive medium, and this latent image is developed by a developing device 10 at a developing station. The visible toner image formed on the photosensitive medium by the developement is transferred from the photosensitive medium 1′ to transfer paper P at an image transfer station, under the action of a corona discharger 11, the paper P being conveyed in the direction of arrow by conveyor rollers 13. At the image transfer station, the paper P is brought into intimate contact with the photosensitive medium 1′ by the action of the discharger 11. The paper P having the toner image transferred thereto is separated from the photosensitive medium by separator means 12 which may be in the form of a belt or a pawl. The paper P is then transported to a fixing device 14, where the toner image is fixed on the paper P. On the other hand, after the image transfer, the surface of the photosensitive medium 1′ is cleaned by a cleaning device 13 for reuse in the above-described image formation process. As already described, the separator means 12 is caused to bear against a small-width area 4 of the photosensitive medium 1′ at the end thereof in the direction perpendicular to the direction of movement thereof, namely, in the direction of the bus bar thereof. The conveyor rollers 13 transport transfer paper P of any width size into the image transfer station through a guide path G which brings a predetermined width area P″ of one side edge of the paper into accord with the small-width area 4 of the photosensitive medium. By this, the side edge area P″ of the paper P engages the separator means 12. By this engagement, the paper P is forcibly separated from the photosensitive medium. The separator means 12 of FIG. 2 is in the form of a pawl and is caused to bear against the area 4 at a position immediately after the image transfer station with respect to the direction of rotation of the photosensitive medium 1′. However, where the separator means 12 is in the form of a belt, the belt-like separator means 12 is caused to bear against the side edge area 4 of the photosensitive medium 1′ at the image transfer station, as shown in FIG. 3. In this case, the conveyor rollers 13 transport the paper P into the image transfer station through the guide path G which causes the ride on the belt-like separator means 12. When the pawl-like means or the like is used as the separator means 12, the side edge area P″ of the paper P directly contacts the side edge area 4 of the photosensitive medium 1′ (and the area 4′ of the insulating layer 26′ which will later be described), and when the belt-like means or the like is used as the separator means, the side edge area P″ of the paper P does not directly contact the area 4 of the photosensitive medium 1′ (and the area 4′ of the insulating layer 26′), but bears against the separator means which in turn bears against the area 4 (area 4′). With regard to both of these cases, in this specification, the side edge area P″ of the paper P is coincident with the side edge area (non-image bearing area) 4 (area 4′) of the photosensitive medium 1′ (insulating layer 26′) at the image transfer station.

Of course, the image bearing area P′ of the transfer paper P is caused to bear against the image bearing area of the photosensitive medium 1′ at the image transfer station.

Now, S designates an original supporting glass table fixed to a fixed location of the outer housing B of the copying apparatus body. The original O to be copied rests on the glass table S. The original O is scanned to slit-expose the photosensitve medium 1′ to the light image of the original O and for that purpose, there are provided first and second movable mirrors $16_1$ and $16_2$. When exposing the photosensitive medium 1′ to the light image, the first mirror $16_1$ and the second mirror $16_2$ are moved parallel to the table S from their solid-line positions to their broken-line positions, respectively, thereby scanning the original O from one end thereof to the other end. The movement velocity of the second mirror $16_2$ is $\frac{1}{2}$ of the velocity of the first mirror $16_1$. Straight tubular fluorescent lamps 17, 18 for illuminating the original and reflectors 19, 20 for reflecting part of the light of the lamps to the original are supported integrally with the mirror $16_1$ by support means 21 and thus, these lamps 17, 18 and reflectors 19, 20 are moved with the mirror $16_1$ to illuminate and scan the original O.

The light reflected by the original O illuminated by the lamps 17, 18 is first reflected by the first mirror $16_1$ to travel to the second mirror $16_2$, and then reflected by the second mirror $16_2$ to travel to a lens 2. This lens 2 forms the light image of the original O on the photosensitive medium 1′ at the exposure station. That is, the light beam passed through the lens 2 is reflected by mirrors 22, 23 fixed in place and passes through the optical slit opening 8′ of the corona discharger 8 to the photosensitive medium. After having thus scanned the original O from one end thereof to the other end, the first mirror, the second mirror, the lamps and the reflectors are moved in the opposite direction to return to their start positions, respectively.

In FIG. 2. the original is scanned by the use of the movable mirrors $16_1$, $16_2$ and movable illuminating device 17, 28, 19, 20. However, alternatively, the mirrors $16_1$, $16_2$, the lamps 17, 18 and the reflectors 19, 20 may be fixed at the shown solid-line positions and the original table S supporting the original O thereon may be moved leftwardly, thereby scanning the original O.

When the scanning of the original is terminated, the table S may be returned to its shown position.

In the apparatus of FIG. 2, an auxiliary exposure light is projected through the slit opening 8' of the charger 8 onto the small-width area 4 of the photosensitive medium against which the separator means 12 bears, by means which will hereinafter be described.

In the above-described apparatus, to obtain a stable effect, the chargers 7, 8 and 11 have a length sufficient to apply corona discharge both to the areas 3 and 4 of the photosensitive medium 1', and the developing device 10 also has a length sufficient to supply toner both to the areas 3 and 4 of the photosensitive medium 1'. Likewise, the lamps 9 illuminates both the areas 3 and 4 of the photosensitive medium 1'.

The present invention is also applicable to an electrophotographic apparatus adopting the so-called Carlson process which uses an electrophotographic photosensitive medium having no transparent insulating layer on the surface thereof and in this case, the lamp 9 is unnecessary and a mere optical slit opening may be employed instead of the discharger 8.

Figure 4:
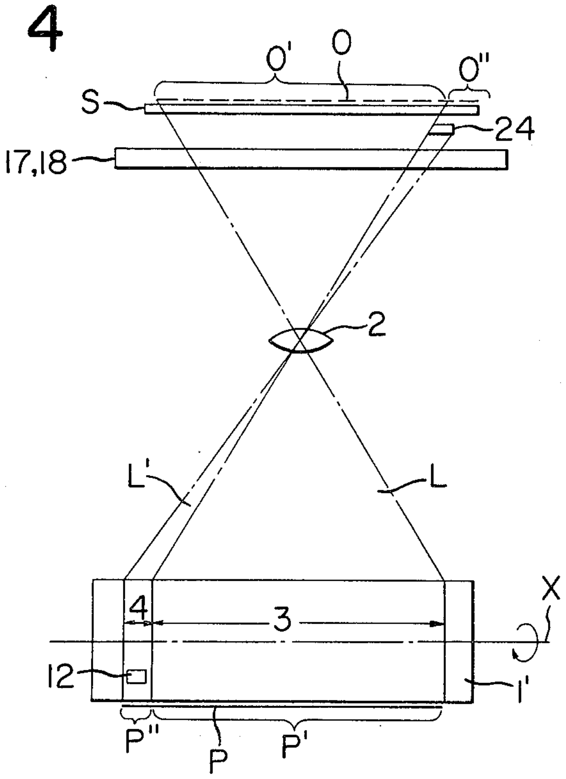
FIG. 4 is a developed view of the optical path in the apparatus of FIG. 2.
Figure 5:
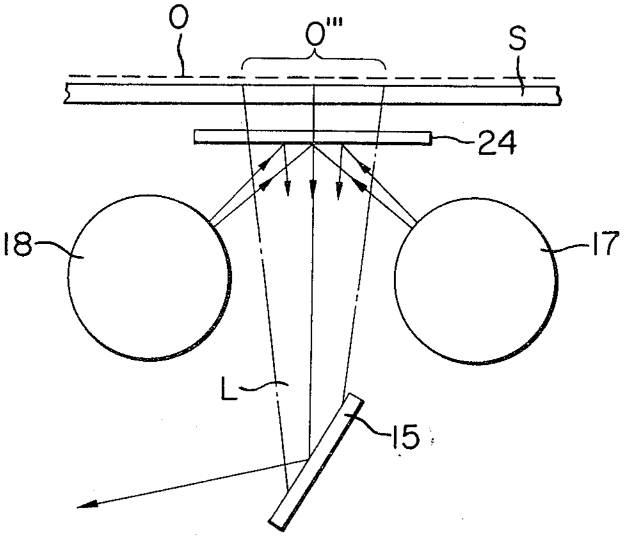
FIG. 5 illustrates essential portions of an embodiment of the present invention.

FIG. 4 is a developed view of the optical path with the mirrors 16$_1$, 16$_2$, 22 and 23 omitted and showing the essential portions of an embodiment of the present invention, the view being taken from a direction perpendicular to the axis X of the drum 1, namely, from the original scanning direction. FIG. 5 is a view of the essential portions of the same embodiment taken from a direction perpendicular to the original scanning direction. Designated by 24 is a small reflecting plate. The reflecting plate 24 is disposed at a position below the original table S and above the lamps 17, 18 and corresponding to that end O'' of the original O supported on the table S with respect to the direction perpendicular to the original scanning direction, so as not to shield an effective image forming light beam (the light beam from the original O imaged on the effective image area 3 of the photosensitive medium) L. More particularly, this reflecting plate 24 is fixedly supported integrally with the lamps 17, 18, their reflectors 19, 20 and the first mirror 16$_1$ by said support means 21 and is movable with the members 16$_1$, 17, 18, 19 and 20 during the original scanning. The underside of the small reflecting plate 24 is formed into a diffusion-reflection surface as by applying a diffusion-reflection paint thereto. Thus, the reflecting plate 24 is opposed to the lamps 17, 18 and the image forming optical system (mirrors 16$_1$, 16$_2$, lens 2 and mirrors 22, 23). Consequently, the light from the end portions of the lamps 17,18 reflected by the small reflecting plate 24 enters the mirror 16$_1$ and passes to the photosensitive medium 1' through the aforementioned image forming optical system and the opening of the discharger 8. More particularly, the reflecting surface of the plate 24, as shown in FIG. 4, is imaged as a light image on the non-image bearing area 4 of the photosensitive medium 1' by the lens 2. Conversely describing, the reflecting plate 24 is disposed at such a position that it is imaged on the area 4 of the photosensitive medium by the image forming optical system. The area 4 is exposed to the light image of the reflecting plate 24 while, at the same time, it is subjected to the corona discharge of the discharger 8 and then is exposed to the light from the lamp 9 and therefore, a light portion potential is formed on this area 4. Accordingly, even if toner is supplied by the developing device 10, no toner adheres to this area 4. In the FIG. 2 embodiment, the supplemental exposure light beam L' by the reflecting plate 24, like the original image forming light beam L, impinges on the photosensitive medium 1' at the position of the charger 8. However, in an electrophotographic copying apparatus adopting the Carlson process, the light beams L and L' may impinge on the photosensitive medium 1' at positions spaced apart with respect to the direction of rotation of the photosensitive medium 1', if between the charger 7 and the developing device 10. As previously described, the reflecting plate 24 is disposed not on the upper surface of the original table S which is a surface conjugate with the photosensitive medium 1' with respect to the lens 2, but below the original table and therefore, the image of the reflecting plate 24 formed on the area 4 is not a so-called accurately focused image, but since the distance between the reflecting plate 24 and the original table is small, there is obtained a sufficiently clear image having practically no inconvenience. That is, the boundary between the areas 3 and 4 of the photosensitive medium is clear. For example, if the diameter of the lens 2 is 40 mm and the focal length thereof is 200 mm and where one-to-one magnification copying is effected, the amount of one-of-focus of the end portion of the image of the reflecting plate is only of the order of 0.5 mm when the reflecting plate 24 is located 7 mm below the original surface. If the focal length of the lens is further shorter or the F-value thereof is further greater, said amount of out-of-focus will become further smaller.

Figure 6:
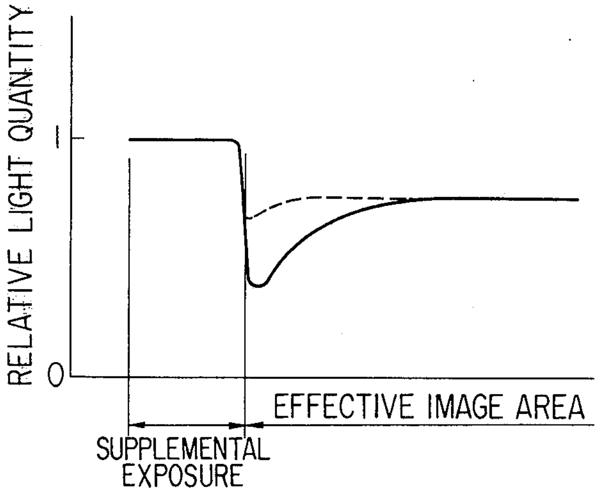
FIG. 6 illustrates the quantity-of-light distribution.

Now, the side edge area O'' of the original O is not copied, whereas the area O' thereof is copied by being projected upon the original image bearing area 3 of the photosensitive medium 1'. In the above-described embodiment, due to the relative positional relation among the original table 14, the reflecting member 24 and the light sources 17, 18, the shadow of the reflecting member 24 sometimes appears near the supplemental exposure portion 4 in the effective image area 3 of the photosensitive surface. This is because, in the portion of the area O' of the original which is near the area O'', the light from the end portions of the light sources 17, 18 is intercepted by the reflecting member 24 and therefore, the intensity of illumination of the original surface is reduced as compared with the other portions. The quantity-of-light distribution measured on the photosensitive medium in such case is shown by a solid curve in FIG. 6. FIG. 6 shows an example of the measurement when white paper was used as the original. In this case, the image tends to produce fog near the supplemental exposure portion 4 in the effective image area 3.

The following embodiment is improved in this point so that the aforementioned reduction in quantity of light is minimized even near the supplemental exposure portion 4 of the effective image area 3 of the photosensitive surface.

Figure 7:
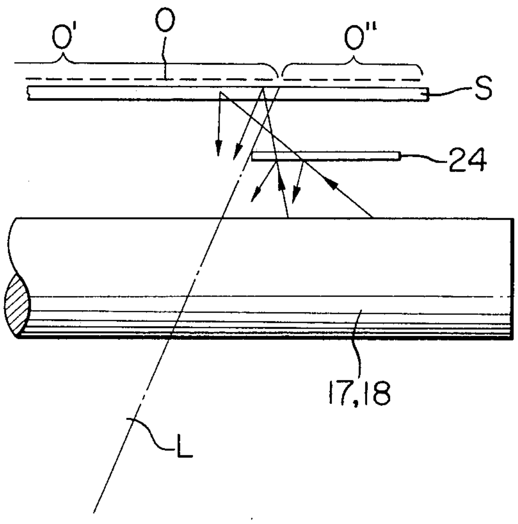
FIGS. 7 and 8 illustrate essential portions of an embodiment of the present invention.
Figure 8:
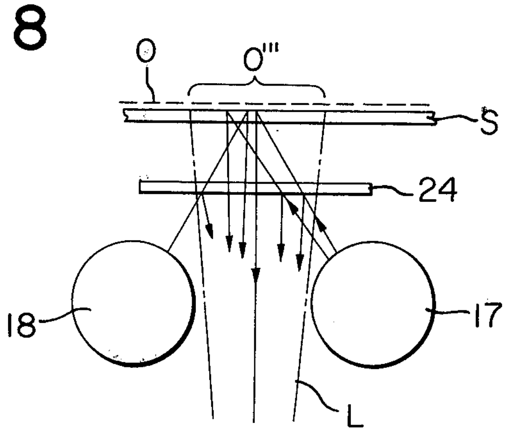

FIGS. 7 and 8 show essential portions of another embodiment. FIG. 7 is a view taken from the original scanning direction, and FIG. 8 is a view taken from a direction perpendicular to the original scanning direction. In the above-described embodiment of FIGS. 4 and 5, the reflecting plate 24 has been an opaque member, whereas in this embodiment, use is made of a reflecting plate 24 which passes part of the reflected light therethrough and reflects part of the reflected light. By using such reflecting member 24, as shown in FIGS. 7 and 8, part of the light from the end portions of the light sources 17, 18 below the reflecting member 24 passes through the reflecting member 24 and illuminates the end of the original area O' imaged on the end portion of the effective image area 3 of the photosensitive surface and therefore, the quantity of light at the end of the area 3 of the photosensitive surface can be increased as indicated by broken line in FIG. 6. Such reflecting member 24 may be provided, for example, by white paper which passes part of the incident light therethrough or a white plastic material having a certain degree of transmission factor. Or alternatively, if the material itself of the reflecting plate 24 is opaque, the reflecting plate 24 may be provided with a number of light passage openings as indicated by 24' in FIG. 9. The light from the lamps 17, 18 passed through the openings 24' of the reflecting plate 24 contributes to the illumination of the end portion of the area O' of the original O projected upon the effective image area of the photosensitive medium as described above and on the other hand, the light from the lamps 17, 18 reflected by the reflecting plate 24 is used for the supplemental exposure in the manner previously described.

Figure 10:
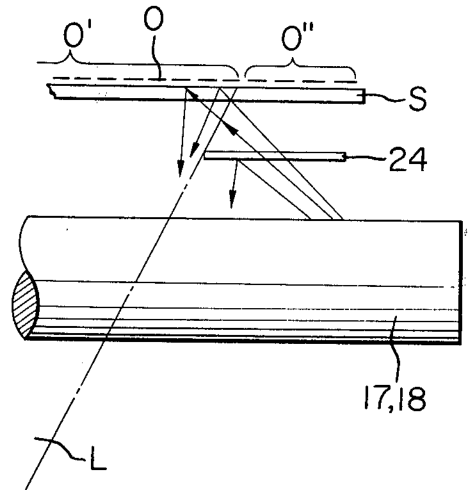
FIGS. 10 and 11 illustrate essential portions of an embodiment of the present invention.
Figure 11:
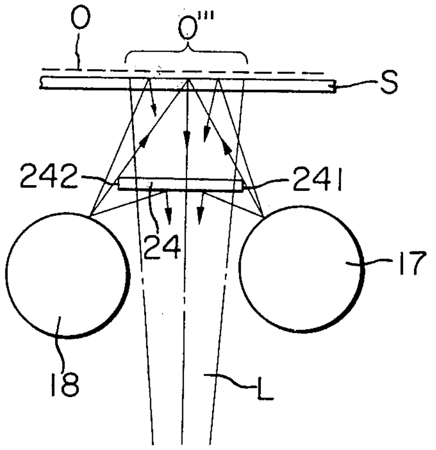

FIGS. 10 and 11 show essential portions of still another embodiment. FIG. 10 is a view taken from the original scanning direction, and FIG. 11 is a view taken from a direction perpendicular to the original scanning direction. In this embodiment, the width of the reflecting plate 24 with respect to the original scanning direction, namely, the width between the side edges 241 and 242 thereof, is set as follows. That is, of the original area O''' simultaneously projected upon the photosensitive medium, in other words, of the original area O''' defined by the image of the optical slit 8' of the charger 8 formed on the original surface by the lens 2, at the side edges of the original area O' imaged in the effective image area 3 of the photosensitive medium, the end portion of at least one of the lamps 17 and 18 can be viewed from any point thereof through at least one side edge 241, 242 of the reflecting plate 24. In FIG. 11, the right half of the side edge portion of the area O''' of the original is not shielded by the reflecting plate 24 but is illuminated by the end of the lamp 17, and the left half is not shielded by the reflective plate 24 but is illuminated by the end of the lamp 18. Thus, the amount of exposure as indicated by broken line in FIG. 6 is obtained at the side edge portion of the area 3 of the photosensitive medium.

Figure 12:
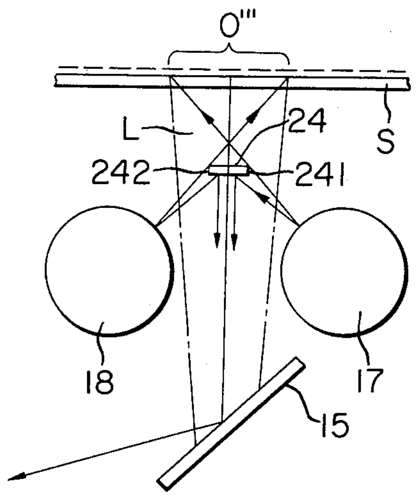
FIG. 12 illustrates essential portions of an embodiment of the present invention.

FIG. 12 shows an embodiment in which the amount of exposure at the side edge portion of the area 3 of the photosensitive medium can be further increased. FIG. 12 is a view of essential portions taken from a direction perpendicular to the original scanning direction. In FIG. 12, the width between the ends 241 and 242 of the reflecting member 24 is smaller than the width of the effective image forming light beam L with respect to the original scanning direction at the position of the reflecting plate 24. (The effective image forming light beam L is the light simultaneously projected upon the area 3 of the photosensitive medium through the optical slit of the charger 8.) In FIG. 12, the end portions of both the lamps 17 and 18 can be viewed from any point of the side edge portion of the area O''' of the original. In other words, any point of the side edge portion of the original O''' is not shielded by the reflecting plate 24 but can be illuminated by the end portions of both the lamps 17 and 18.

Figure 9:
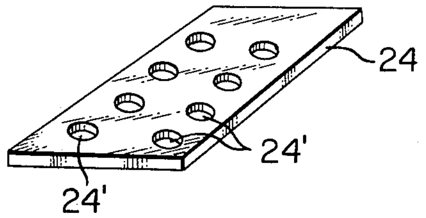
FIG. 9 illustrates an example of the reflecting plate.

Again in the embodiments of FIGS. 10, 11 and 12, the reflecting plate 24 may be formed of a material having a part transmitting characteristic as mentioned in connection with FIGS. 7, 8 and 9, or may be formed into a reflecting plate having at least one light passage opening 24'. Of course, the reflecting plates 24 of FIGS. 10, 11 and 12 may be formed of an opaque material which does not have the opening 24'.

Still another embodiment will now be described. Where the reflecting member 24 is a diffusion-reflection surface as in the previously described embodiments, a sufficiently great amount of supplemental exposure sometimes cannot be secured depending on the relative arrangement of the light source and the reflecting member. Also, where the method of varying the brightness of the light source as described in U.S. Application Ser. No. 068,416, filed Aug. 21, 1979, or the known method of providing a diaphragm in or before or behind the lens 2 and adjusting the amount of opening of the diaphragm is adopted as the method for varying the amount of exposure in accordance with the original, if the amount of exposure of the original image is extremely reduced, the quantity of exposure light may likewise be reduced and therefore, the potential on the photosensitive drum at the supplemental exposure area may not become a sufficient light portion potential, with a result that toner adheres thereto. For this reason, it is desirable always to secure a relatively great amount of exposure of the supplemental exposure area 4.

Figure 13:
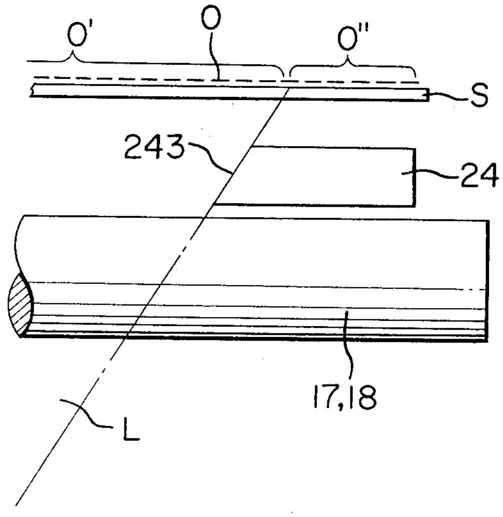
FIGS. 13 and 14 illustrate essential portions of an embodiment of the present invention.
Figure 14:
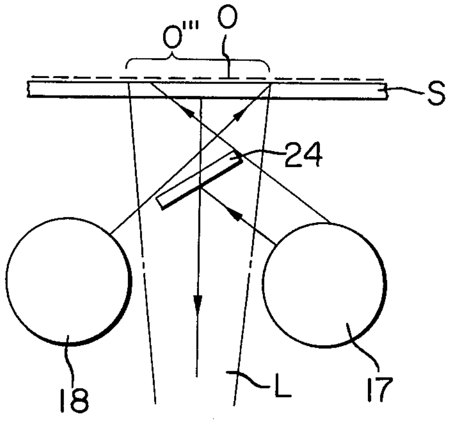

In FIGS. 13 and 14, the surface of the reflecting member 24 which faces the light source 17 is a mirror surface having a sufficiently high regular reflection factor and directs the regular reflected light from the light source 17 to the non-image bearing area 4 of the photosensitive medium through said image forming optical system. By thus using the regular reflected light, a double to treble quantity of light can be obtained as compared with the case where the diffused-reflected light is used. FIG. 13 is a view of essential portions taken from the original scanning direction, and FIG. 14 is a view of essential portions taken from a direction perpendicular to the original scanning direction. In this embodiment, the edge 243 of the reflecting plate 24 along which the edge portion of the effective image forming light beam L passes is cut and formed so as to be along the edge portion of the oblique light beam L, as shown. This is because the reflecting plate 24 must be inclined with respect to the original table S in order that a great quantity of regular reflected light may be directed from the lamp 17 to the projection optical system, and for the purpose of preventing the edge 243 from kicking the effective image forming light beam in that case.

Figure 15:
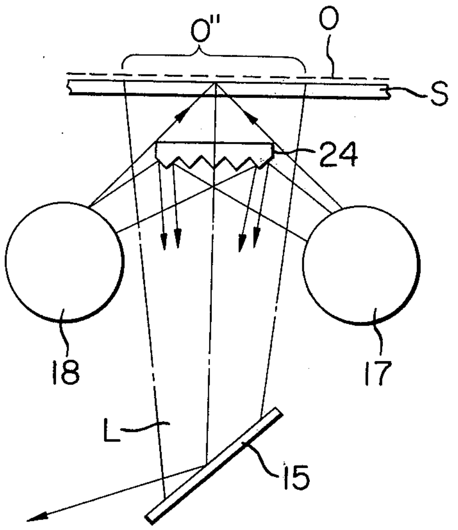
FIG. 15 illustrates essential portions of an embodiment of the present invention.

Still another embodiment is shown in FIG. 15. In the embodiment as shown in FIGS. 13 and 14, it is necessary that the reflecting surface of the reflecting member 24 be not parallel but inclined with respect to the surface of the original. Therefore, there is an undesirable possibility that the portion of the reflecting plate 24 which is remote from the surface of the original does not provide sufficient sharpness on the photosensitive medium. The embodiment of FIG. 15 eliminates such disadvantage. FIG. 15 is a view of essential portions taken from a direction perpendicular to the original scanning direction. In FIG. 15, that surface of the reflecting member 24 which is opposed to the light sources 17 and 18 is formed with triangular concave-convexities as viewed in the plane of the FIG. 15 drawing sheet, and the sloped surfaces of the convexities have a high regular reflection factor. In this embodiment, the right sloped surface of each convexity is opposed to the light source 17 and the projection optical system, and the left sloped surface of each convexity is opposed to the light source 18 and the projection optical system, so as to reflect the lights from the light sources, respectively, and to direct the lights to the projection optical system. The reflecting member 24 of such construction is disposed parallel to the original table S and can illuminate the area 4 of the photosensitive medium with a great quantity of light. As the reflecting plate 24 of FIG. 15, use may be made of a reflecting plate having no image forming function, but a Fresnel reflecting plate having an imge forming function can also be used. In the latter case, the Frenell reflecting plate 24 having an image forming function may be disposed so as to form substantially at the position of the original surface O the virtual image of the surface portion of the lamp 17 and/or 18 which is opposed to the reflecting plate 24. This virtual image is projected and formed on the supplemental exposure area 4 of the photosensitive medium by the lens 2. Besides the Fresnel reflecting plate, a conventional concave mirror having an image forming function may also be used, and in any case, if a reflecting plate having an image forming function is thus used to form the virtual image of the light source on or near the original surface, the supplemental exposure may be realized very clearly and with a great quantity of light. Also, where the reflecting plate having an image forming function as described is used, design may be made such that the virtual image of the lamp 17 and/or 18 is not once formed but that the image of the lamp 17 and/or 18 is formed on the area 4 of the photosensitive medium 1' by the cooperation of the reflecting plate 24 and the lens 2. The embodiment of FIG. 15, if seen from the original scanning direction, will become such as shown in FIG. 10.

Again in the embodiments of FIGS. 13 to 15, the reflecting plate width with respect to the original scanning direction as described in connection with FIG. 10 or FIGS. 11 and 12 is of course applicable. Also, in the embodiments of FIGS. 13 to 15, use may be made of the reflecting plate 24 having a part transmission characteristic or having at least one light passage opening as described in connection with FIGS. 7 to 9. The term "regular reflection" used in the description of FIGS. 13 to 15 is a term which refers to a case where the light beam incident on a reflecting surface is reflected at a reflection angle equal to the angle of incidence.

In the foregoing embodiments, straight tubular fluorescent lamps have been employed as the light sources, but straight tubular halogen lamps may also be employed. In any case, it is desirable that the length of the light source with respect to the direction perpendicular to the original scanning direction be greater than the original width (with respect to said direction) projected on the effective image area 3 and that the opposite ends thereof be projected outwardly of the side edges of the original with respect to said direction. Alternatively, a plurality of spherical lamps may be disposed along said direction.

The present invention is also applicable to a copying apparatus having a so-called ADF device in which a sheet-like original is held between rollers or the like and conveyed through an illuminating station comprising lamps 17 and 18 whereby the original is scanned. In that case, in FIG. 2, the mirrors 15, 16, lamps 17, 18 and reflectors 19, 20 are fixed at predetermined positions and of course, the reflecting plate 24 is also fixed to the support member 21.

Figure 17:
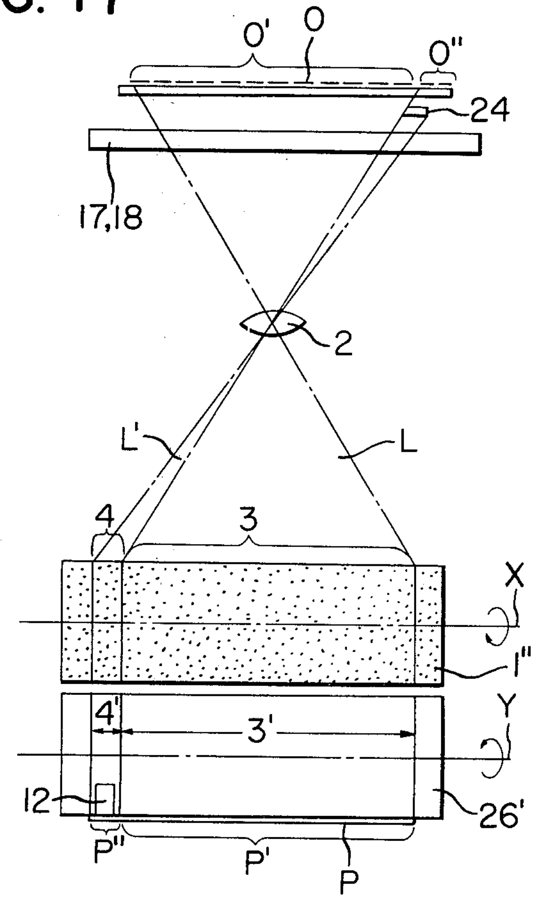
FIG. 17 is a developed view of the optical path in the apparatus of FIG. 16.
Figure 16:
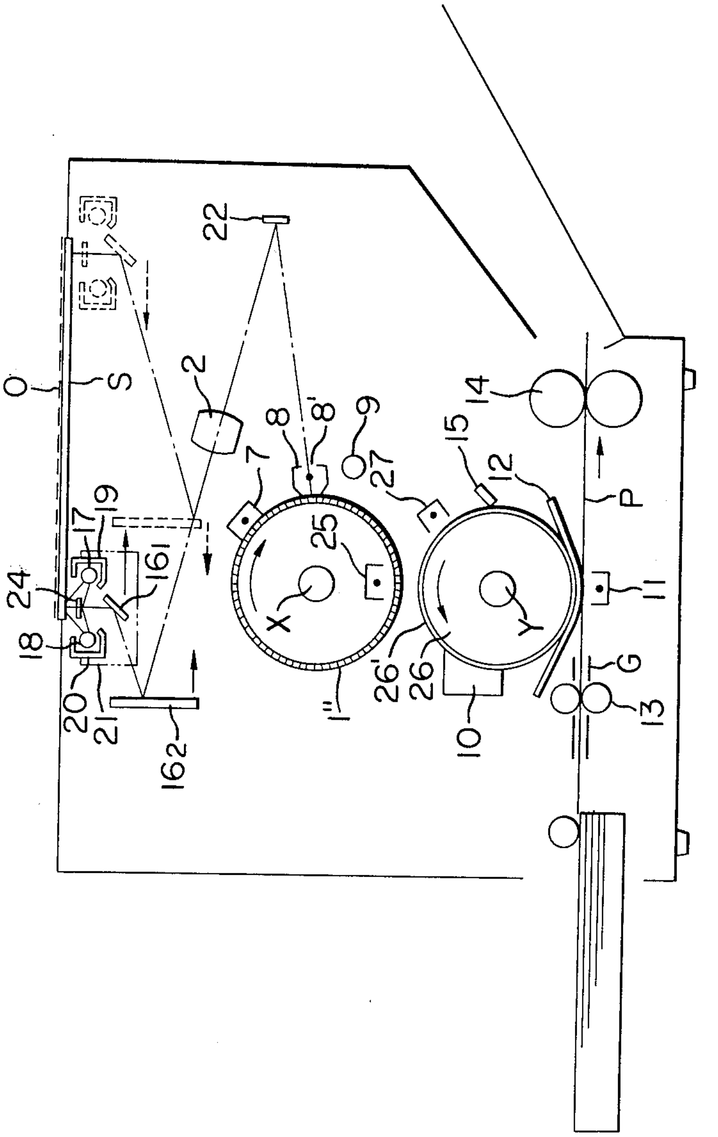
FIG. 16 illustrates an embodiment of the present invention.

In the above-described embodiments, the latent image formed on the photosensitive medium 1' has been developed on the photosensitive medium, but the present invention is also applicable to a copying apparatus as shown in FIGS. 16 and 17 wherein the latent image formed on a photosensitive medium is used to form a secondary latent image on an image bearing member separate from the photosensitive medium and this secondary image is developed. FIG. 17 is a developed view of the optical path with mirrors $16_1$, $16_2$ and 22 omitted. In FIGS. 16 and 17, means having common constructions and common functions to those means used in the above-described embodiments are given similar reference characters.

In FIGS. 16 and 17, reference character 1" designates an electrophotographic photosensitive medium rotatable about its axis X in the direction of arrow. This photosensitive medium is a so-called screen like photosensitive medium having a number of mesh openings. This screen-like photosensitive medium comprises an electrically conductive member, a photoconductive member and a transparent insulating member layered in succession. It is charged by a charger 7, whereafter it is exposed to the light image of an original by an image forming optical system (in which a mirror 23 is omitted as compared with the image forming optical system of FIG. 2) while, at the same time, it is subjected to corona discharge by a charger 8, and then the whole surface thereof is uniformly exposed to the light from a lamp 9, whereby a primary electrostatic latent image is formed on the photosensitive medium. This primary electrostatic latent image is used to form a secondary electrostatic latent image.

That is, in a secondary latent image forming station, a corona discharger 25 is disposed within the screen drum 1". Designated by 26 is a drum having an insulating layer 26' on the peripheral surface thereof. This drum 26 is rotated about its axis Y in the direction of arrow and through the secondary latent image forming station. The corona current emitted by the discharger 25 passes through the mesh openings of the screen 1" and at that time, it is modulated correspondingly to the primary latent image formed on the screen 1". By this, a corona discharge current corresponding to the primary latent image pattern reaches the insulating layer 26' of the drum 26, whereby a secondary electrostatic latent image corresponding to the original O is formed on the layer 26'. With the rotation of the drum 26, this secondary latent image is developed by a developing device 10, and the thus obtained visible toner is transferred to paper P at an image transfer station. After the image transfer, the surface of the drum 26 is cleaned by a cleaner 15 to remove any residual toner therefrom, and subsequently is deelectrified by a deelectrifier 27. The paper P having the toner image transferred thereto is separated from the surface of the drum 26 by separator means 12 and transported to a fixing device 14.

Now, an image bearing area 3' and a non-image bearing area 4' are set on the layer 26' of the drum 26. In the secondary latent image forming station, said image bearing area 3' and said non-image bearing area 4' are opposed to the image bearing area 3 and the non-image bearing area 4, respectively, of the photosensitive medium 1". On the other hand, the area O' of the original O which is to be copied is projected upon the area 3 of the photosensitive medium 1" by said image forming optical system. The light from lamps 17, 18 reflected by a reflecting plate 24 passes to the area 4 of the photosensitive medium 1" through said image forming optical system and the slit 8' of the charger 8. In other words, the light image of the reflecting plate 24 is formed on the area 4 and therefore, a light portion potential is formed on this area 4. Accordingly, the electrostatic latent image of the area O′ of the original is formed on the area 3′ of the insulating layer 26′ of the drum 26, while not the original image but a light portion potential is formed on the area 4′. Accordingly, when the drum 26 passes through the developing device 10, toner adheres to the area 3′ corresponding to the latent image but no toner adheres to the area 4′. Separator means 12 which may be in the form of a belt or a pawl is caused to bear against the area 3′ of the drum 26 surface. On the other hand, paper conveyor means 13 conveys the paper P into the image transfer station under the guidance of paper guide means G which brings a predetermined width area P″ of one of the side edge portions of the paper P into accord with the area 3′ of the drum 26. The image supporting area P′ of the paper P is brought into intimate contact with the area 3′ of the drum 26 surface. The side edge area P″ of this paper P engages the separator means in the same manner as previously described, whereby the paper is separated from the drum 26.

Again in the embodiment of FIGS. 16 and 17, the chargers 7 and 8 apply corona discharge to the areas 3 and 4 of the photosensitive medium 1″ and the lamps 9 irradiates the areas 3 and 4 with light. The developing device 10 supplies toner both to the areas 3′ and 4′ of the insulating layer 26′ of the drum 26.

In the embodiment of FIGS. 16 and 17, a reflecting plate similar to those described in connection with FIGS. 5 to 15 may be used as the reflecting plate 24. Also, the reflecting plate 24 is fixed to the lamps 17, 18 and mirror $\mathbf{16_1}$ as in the above-described embodiments. Accordingly, in a copying apparatus wherein mirrors $\mathbf{16_1}$ and $\mathbf{16_2}$ are moved relative to the fixed original table S in the manner described to thereby scan the original, the reflecting plate 24, with the lamps 17, 18 and the reflectors 19, 20, is moved integrally with the mirror $\mathbf{16_1}$. On the other hand, in a copying apparatus wherein the original table S is moved or an ADF device is used to scan the original as already described, the reflecting plate 24 is fixed in place with the mirror $\mathbf{16_1}$, lamps 17, 18 and reflectors.

Again in the embodiment of FIGS. 16 and 17, the screen photosensitive medium 1″ may be one having no surface insulating layer and in this case, the charger 8 may be replaced by a mere optical slit and the lamp 9 is unnecessary. Further, in this case, the original light image exposure position for the area 3 of the photosensitive medium and the position for imparting the supplemental exposure light to the area 4 of the photosensitive medium by the reflecting plate 24 may lie at different locations with respect to the direction of rotation of the screen 1″ if both of these positions are between the charger 7 and the secondary latent image forming station.

In the above-described embodiments, the separator means 12 bears against the photosensitive medium 1′ or the insulating layer 26′. However, the separator means 12 may alternatively be disposed with a minute gap between it and the photosensitive medium 1′ or the insulating layer 26′. This is useful when the separator means 12 is in the form of a pawl.

In the above-described embodiments, the reflecting plate 24 is not fixed to the original table S but is fixed to the lamps 17, 18 at a position between the table S and the lamps 17, 18. Accordingly, whichever of the previously described scanning systems is adopted, there is an advantage that the reflecting plate 24 is small-sized and simple and the positioning thereof can be done easily and accurately.

In the foregoing description, the side edge portions of the original O refer to the end portions of the original with respect to the direction perpendicular to the original scanning direction, the end portions of the lamps 17, 18 refer to the end portions thereof with respect to said direction, the side edge portions of the photosensitive medium 1′, 1″ and the insulating member 26′ refer to the end portions thereof with respect to the direction perpendicular to the direction of movement thereof, and the side edge portions of the transfer paper P refer to the end portions thereof with respect to the direction perpendicular to the direction of conveyance of the transfer paper.

What we claim is:

1. An electrophotographic copying apparatus comprising:

original supporting means for supporting thereon an original to be copied;

an electrophotographic photosensitive medium movable through a charging station, a developing station and an image transfer station, said photosensitive medium having an image bearing area and a non-image bearing area set thereon, said non-image bearing area being set on the side edge portion of said photosensitive medium;

charging means for charging both of said two areas of said photosensitive medium at said charging station;

original scanning means, including illuminating means movable relative to the original for illuminating the original, and a projection optical system for projecting the optical image of said original illuminated by said illuminating means upon said image bearing area of said photosensitive medium between said charging station and said developing station to form an electrostatic latent image;

developing means for developing said electrostatic latent image into a visible image at said developing station;

image transfer means for transferring said visible image from said photosensitive medium to a transfer medium at said image transfer station;

supply means for supplying said transfer medium to said image transfer station along a path which brings a predetermined width area of the side edge portion of said transfer medium into accord with said non-image bearing area of said photosensitive medium;

separator means adapted to engage said predetermined width area of said transfer medium to separate from said photosensitive medium, said transfer medium having said visible image transferred thereto; and reflecting means disposed at a position between said illuminating means and said original supporting means and corresponding to the side edge portion of said original supported by said original supporting means, said reflecting means moving relative to the original during the operation of said original scanning means, wherein the light from said illuminating means, reflected by said reflecting means, passes through said projection optical system and impinges on said non-image bearing area of said photosensitive medium between said charging station and said developing station.

2. The apparatus according to claim 1, wherein said reflecting means is formed of a material having a property of passing part of incident light therethrough, and wherein the light from said illuminating means which passes through said reflecting means impinges on said original.

3. The apparatus according to claim 1, wherein said reflecting means has at least one light passage opening and the light from said illuminating means which passes through said light passage opening impinges on said original.

4. The apparatus according to claim 1, wherein said reflecting means has a diffusing-reflecting property.

5. The apparatus according to claim 1, wherein said reflecting means has a regular reflection property.

6. The apparatus according to claim 5, wherein said reflecting means has a plurality of small sloped surfaces each having a regular reflection property.

7. The apparatus according to any one of claims 1-6, wherein said original supporting means is fixed at a predetermined position, and wherein said illuminating means and reflecting means move integrally with each other along said original supporting means.

8. The apparatus according to any one of claims 1-6, wherein said illuminating means is fixed at a predetermined position, said scanning means moves said original relative to said fixed illuminating means, and said reflecting means is fixed relative to said illuminating means.

9. The apparatus according to any one of claims 1-6, wherein said reflecting means is disposed at such a position that the light from said illuminating means which passes through the end of said reflecting means with respect to the original scanning direction can impinge on at least the side edge portion of said original.

10. The apparatus according to claim 9, wherein the width of said reflecting means with respect to the original scanning direction is smaller than the width of the effective image forming light beam at the position of said reflecting means with respect to the original scanning direction.

11. The apparatus according to any one of claims 1 to 6, wherein said separator means bears against said photosensitive medium at said non-image bearing area thereof.

12. The apparatus according to any one of claims 1 to 6, wherein said separator means is in proximity to said non-image bearing area of said photosensitive medium.

13. An electrophotographic apparatus comprising:

original supporting means for supporting thereon an original to be copied;

an electrophotographic photosensitive medium movable through a charging station and a secondary electrostatic latent image forming station in succession, said photosensitive medium having an image bearing and a non-image bearing area set thereon, said non-image bearing area being set on the side edge portions of said photosensitive medium;

charging means for charging both of said two areas of said photosensitive medium at said charging station;

original scanning means, including illuminating means movable relative to the original for illuminating the original, and a projection optical system for projecting the optical image of said original illuminated by said illuminating means upon said image bearing area of said photosensitive medium between said charging station and said secondary electrostatic latent image forming station to form a primary electrostatic latent image;

an image bearing member movable through said secondary electrostatic latent image forming station, a developing station and an image transfer station in succession, said image bearing member having an image bearing area and a non-image bearing area set thereon, said image bearing member being disposed at said secondary electrostatic latent image forming station so that the image bearing area and non-image bearing area of said image bearing member correspond to the image bearing area and non-image bearing area, respectively, of said photosensitive medium;

means for forming a secondary electrostatic latent image on the image bearing area of said image bearing member by using the primary electrostatic latent image formed on said photosensitive medium, at the secondary electrostatic latent image forming station;

developing means for developing said secondary electrostatic latent image into a visible image at the developing station;

image transfer means for transferring said visible image from said image bearing member to a transfer medium at the image transfer station;

supply means for supplying said transfer medium to said image transfer station along a path which brings a predetermined width area of the side edge portion of said transfer medium into accord with said non-image bearing area of said image bearing member;

separator means adapted to engage said predetermined width area of said transfer medium to separate from said image bearing member said transfer medium having said visible image transferred thereto; and reflecting means disposed at a position between said illuminating means and said original supporting means and corresponding to the side edge portion of said original supported by said original supporting means, said reflecting means moving relative to the original during the operation of said original scanning means, wherein the light from said illuminating means reflected by said reflecting means passes through said projection optical system and impinges on said non-image bearing area of said photosensitive medium between said charging station and said secondary electrostatic latent image forming station.

14. The apparatus according to claim 13, wherein said reflecting means is formed of a material having a property of passing part of incident light therethrough, and the light from said illuminating means which passes through said reflecting means impinges on said original.

15. The apparatus according to claim 13, wherein said reflecting means has at least one light passage opening and the light from said illuminating means which passes through said light passage opening impinges on said original.

16. The apparatus according to claim 13, wherein said reflecting means has a diffusing-reflecting property.

17. The apparatus according to claim 13, wherein said reflecting means has a regular reflection property.

18. The apparatus according to claim 17, wherein said reflecting means has a plurality of small sloped surfaces each having a regular reflection property.

19. The apparatus according to any one of claims 13–18, wherein said original supporting means is fixed at a predetermined position, and wherein said illuminating means and reflecting means move integrally with each other along said original supporting means.

20. The apparatus according to any one of claims 13–18, wherein said illuminating means is fixed at a predetermined position, said scanning means moves said original relative to said fixed illuminating means, and said reflecting means is fixed relative to said illuminating means.

21. The apparatus according to any one of claims 13–18, wherein said reflecting means is disposed at such a position that the light from said illuminating means which passes through the end of said reflecting means with respect to the original scanning direction can impinge on at least the side edge portion of said original.

22. The apparatus according to claim 21, wherein the width of said reflecting means with respect to the original scanning direction is smaller than the width of the effective image forming light beam at the position of said reflecting means with respect to the original scanning direction.

23. The apparatus according to any one of claims 13 to 18, wherein said separator means bears against said image bearing member at said non-image bearing area thereof.

24. The apparatus according to any one of claims 13 to 18, wherein said separator means is in proximity to said non-image bearing area of said image bearing member.

25. An electrophotographic copying apparatus comprising:

original supporting means for supporting thereon an original to be copied;

a movable electrophotographic photosensitive medium having an image bearing area and a non-image bearing area set thereon, said non-image bearing area being set on the side edge portion of said photosensitive medium;

charging means for charging both of said two areas of said photosensitive medium at a charging station;

original scanning means, including illuminating means movable relative to the original for illuminating the original;

a projection optical system for projecting the optical image of said original illuminated by said illuminating means upon said image bearing area of said photosensitive medium charged by said charging means;

reflecting means disposed at a position between said illuminating means and said original supporting means and below the side edge of said original supported by said original supporting means, said reflecting means moving relative to the original during the operation of said original scanning means, wherein the light from said illuminating means reflected by said reflecting means passes through said projection optical system and impinges on said non-image bearing area of said photosensitive medium charged by said charging means.

26. The apparatus according to claim 25, wherein said original supporting means is fixed at a predetermined position, and wherein said illuminating means and said reflecting means move integrally with each other along said original supporting means.

27. The apparatus according to claim 25, wherein said illuminating means is fixed at a predetermined position, said scanning means moves said original relative to said fixed illuminating means, and said reflecting means is fixed relative to said illuminating means.

28. The apparatus according to claim 25, wherein said reflecting means is disposed at such a position that the light from said illuminating means which passes through the end of said reflecting means with respect to the original scanning direction can impinge on at least the side edge portion of said original.

29. The apparatus according to claim 28, wherein the width of said reflecting means with respect to the original scanning direction is smaller than the width of the effective image forming light beam at the position of said reflecting means with respect to the original scanning direction.

30. The apparatus according to any one of claims 25–29, wherein said reflecting means projects internally beyond the side edge of the original with respect to the direction perpendicular to the scanning of the original.

* * * * *

UNITED STATES PATENT AND TRADEMARK OFFICE
CERTIFICATE OF CORRECTION

PATENT NO. : 4,334,763
DATED : June 15, 1982
INVENTOR(S) : HARUHISA HONDA, ET AL.

It is certified that error appears in the above—identified patent and that said Letters Patent is hereby corrected as shown below:

Col. 1, line 45, change "practised" to --practiced--.

Col. 3, line 8, change "Fig. 1" to --Fig. 2--;
line 49, change "13" to --15--.

Col. 4, line 6, (first occurrence) change "the" to --it to--.

Col. 6, line 23, change "one-of-focus" to --out-of-focus--;
line 27, change "shorter" to --shortened--; and
change "further" to --made--;
line 28, change "further" to --even--.

Col. 8, line 1, after "24' " insert --(Fig. 9)--

Col. 9, line 10, change "imge" to --image--;
line 11, change "Frenell" to --Fresnell--.

Signed and Sealed this

*Twenty-first* Day of *December 1982*

[SEAL]

*Attest:*

GERALD J. MOSSINGHOFF

*Attesting Officer* *Commissioner of Patents and Trademarks*